April 21, 1970     W. PRIESEMUTH     3,508,069
GENERATOR MEANS

Filed April 10, 1967     2 Sheets-Sheet 1

Inventor:
Wolfgang Priesemuth

April 21, 1970   W. PRIESEMUTH   3,508,069
GENERATOR MEANS

Filed April 10, 1967   2 Sheets-Sheet 2

Inventor:
Wolfgang Priesemuth
By Walter Becker

United States Patent Office 3,508,069
Patented Apr. 21, 1970

3,508,069
GENERATOR MEANS
Wolfgang Priesemuth, Itzehoe-Nordoe, Germany
Filed Apr. 10, 1967, Ser. No. 629,529
Claims priority, application Germany, Apr. 22, 1966,
P 39,253
Int. Cl. H02p 9/04
U.S. Cl. 290—1                                  9 Claims

ABSTRACT OF THE DISCLOSURE

A generator system which comprises a plurality of electrical generators, the outputs of which are connected together in parallel while the rotatable parts of said generators are mounted on a common shaft. Each generator is staggered relative to the other generator so that the maximum reactive torques of respective generators are obtained at different angular positions of the shaft which latter is driven by driving means comprising storage means which are adapted to store mechanical energy and which are coupled to the shaft.

---

This invention relates to generator means.

Generators comprising a permanent magnet rotor, of the kind used for instance for supplying current to bicycle lamps, are fairly efficient. However, the reactive driving torque of such generators, caused by the magnetic forces of attraction, is subject to considerable cyclic fluctuations.

It is an object of the present invention to provide generator means of the above specified kind wherein these fluctuations may be reduced.

According to the present invention, generator means comprise a plurality of electrical generators whose outputs are connected together in parallel and whose rotatable parts are mounted on a common shaft, each generator being staggered relative to the other generator or generators so that the maximum reaction torques of respective generators are obtained at different angular positions of the shaft, and driving means for the shaft which comprise means for storing mechanical energy and means coupling the storage means to the shaft.

The storage means may comprise spring means. Alternatively, the storage means may be a weight which, in operation, descends under the influence of gravity. In either case the driving means may include an electric motor for winding the spring means or raising the weight.

Suitably, the coupling means are adapted, in operation, to cause oscillatory movement of the shaft.

The outputs of the generators may be connected to a common output via respective rectifier means.

The invention will now be described, by way of example, with reference to the accompanying drawings, in which.

Figure 1:
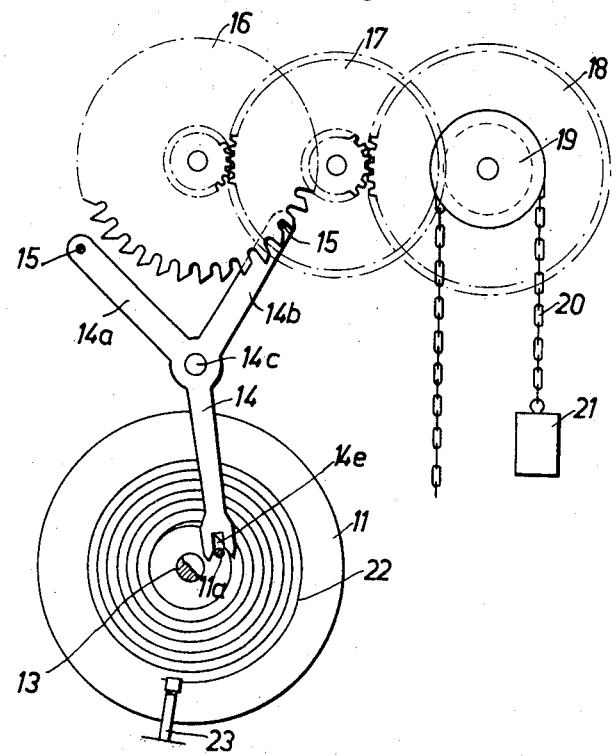
FIG. 1 is a schematic plan view of generator means according to the present invention and suitable for operating a lamp.
Figure 2:
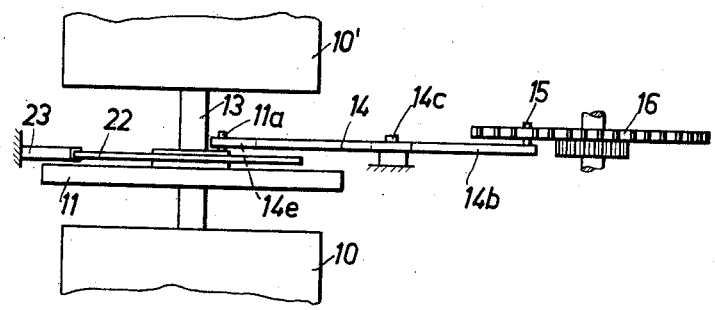
FIG. 2 is a side view of the generator means shown in FIGURE 1.

In FIGURES 1 and 2 two generators, each comprising a permanent magnet rotor of the kind used for supplying current to bicycle lamps, are generally indicated by the reference numbers 10 and 10'. Rotatable parts of the two generators 10 and 10' are mounted on a common drive shaft 13 in relative angular positions so chosen that the peak reactive torques of the two generators do not coincide or, preferably, that the peak reactive torques of one generator coincide with the minimum reactive torques of the other generator. With this angular arrangement the overall reactive torque will be fairly uniform, permitting a spring or a falling weight to be used as the drive means. Naturally, the number of associated generators may be increased to three or more, each generator being angularly displaced in phase in relation to the others mounted on a common drive shaft. However, generally the association of two generators will be quite sufficient.

In the embodiment illustrated in FIGURES 1 and 2 the generator means are driven by a weight 21 which, when falling under the influence of gravity, drives the shaft 13 through coupling means comprising a chain 20, a chain wheel 19, a transmission comprising gear wheels 17, 18, a scape wheel 16, an anchor 14, a rotary oscillator 11 and a spiral balance spring 22. The drive is therefore similar to a clock movement which depends upon the oscillation of a balance wheel, in other words comprising a scape wheel 16 having specially shaped teeth which cooperate with pallets 15 on the ends of the arms 14a and 14b of the anchor 14. The anchor is pivotably mounted at 14c. The end 14d of the anchor is provided with a slot 14e which embraces a pin 11a on the rotary oscillator 11. The rotary oscillator 11 is secured to the shaft 13 of the generators 10 and 10', one end of the balance spring 22 being attached to the shaft and the other end to an anchoring pin 23. The position of the rotary oscillator when at rest may be adjusted by moving the spring anchoring pin 23.

In operation of the driving means one of the teeth of the scape wheel 16 is urged in a clockwise direction by the weight 21, giving one of the pallets 15 a push to rotate the anchor 14 in an anticlockwise direction and thereby causing a driving impulse to be imparted to the pin 11a on the rotary oscillator. The deflection of the anchor 14 brings the other pallet 15 into engagement with the teeth of the scape wheel 16 and checks further rotation of the scape wheel. During its return swing under the influence of spring 22 the rotary oscillator passes through its normal position of rest and the pin 11a re-engages the slot 14e in the anchor 14, deflecting the anchor back into its opposite end position. The pallet 15 which had so far checked the scape wheel rides over the thrust flank of the scape wheel teeth which it had locked and receives a push which is transmitted as a driving impulse to the rotary oscillator in the opposite direction to that of the preceding impulse. The rotary oscillator 11 together with the entire generator assembly therefore performs oscillatory motions about a mid-swing position of rest. The amplitude of the oscillation may be arranged to be equal to the pitch of the poles of the generator assembly.

Instead of the power for the drive being supplied by a falling weight 21, which can be pulled up from time to time, it may be supplied by a spring which can be re-wound by hand. Alternatively, the weight may be pulled up or the spring re-wound by a special motor which may be fed from the mains and which stores sufficient mechanical energy in the spring for keeping the lamp slight for a given period of time. Alternatively, the winding motor may be fed from a vehicle battery.

Figure 3:
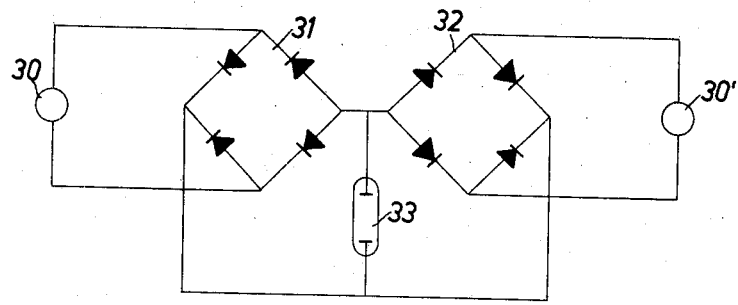
FIG. 3 is a circuit diagram including the lamp and generators of the generator means of FIGURE 1.

FIGURE 3 illustrates a circuit for supplying a lamp with the electrical current. Two generators 30 and 30', corresponding to the above generators 10 and 10', respectively, generate an alternating current which they deliver to the inputs of rectifiers 31 and 32, respectively. The rectifiers 31 and 32 have their outputs connected in parallel and prevent one generator from feeding the other. The type of rectifier employed is quite arbitrary though in the illustrated embodiment the rectifiers are rectifier bridges which for optimum efficiency, preferably contain silicon diodes.

The lamp may likewise be of any conventional kind, but is efficiency should be optimal. For this reason it may be desirable to use a fluorescent tube 33. The high voltage required for operation may be provided by a step-up transformer. Alternatively, the generators 30 and 30' themselves could be provided with an appropriately designed stator winding.

Figure 4:
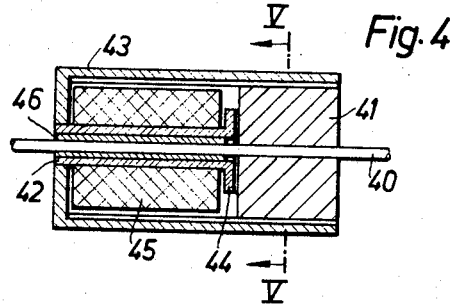
FIGS. 4 and 5 are axial and transverse cross sections, respectively, of a generator in the generator means of FIGURE 1.
Figure 5:
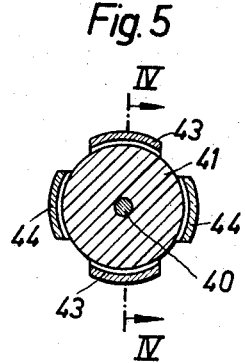

FIGURES 4 and 5 are axial and transverse cross sections, respectively, of one of the generators 10, 10' shown in FIGURE 2. In the generator shown in FIGURES 4 and 5 a permanent magnet 41 having four radially magnetised poles is mounted on a shaft 40. An iron tube 42 forms the magnetic yoke between the stator poles and contains a brass tube 46 which serves as a bearing liner. Two pairs of poles 43 and 44 have their free ends embracing the permanent magnet rotor. 45 is the generator winding.

Apart from lamps many other electrical devices which are to be operated at places remote from the mains may be powered by generator means according to the invention.

It is, of course, to be understood that the present invention is, by no means, limited to the particular structure shown in the drawings, but also comprises any modifications that will appear to those skilled in the art.

What I claim is:

1. Generator means comprising a plurality of magnetically-entirely-separated electrical generators whose outputs are connected together electrically only in parallel and whose rotatable parts are mounted on a common shaft, each generator having its own armature poles, field poles as well as field windings and being staggered relative to at least one other generator so that the maximum reactive torques of respective generators are obtained at different angular positions of the shaft relative to respective magnetically-entirely-separate electrical generators, and driving means for the shaft which comprise means for storing mechanical energy and means coupling the storage means to the common shaft.

2. Generator means according to claim 1, wherein said energy storage means comprise spring means.

3. Generator means according to claim 1, wherein said energy storage means comprise a weight which, in operation, descends under the influence of gravity.

4. Generator means according to claim 2, wherein said driving means include an electric motor for winding said spring means.

5. Generator means according to claim 1, wherein said coupling means are adapted, in operation, to cause oscillatory movement of the common shaft.

6. Generator means according to claim 1, where the outputs of the generators are connected to a common output of an electrical circuit via respective rectifier means.

7. Generator means according to claim 6, in which an electric lamp is connected to a common output of the generators in an electrical circuit.

8. Generator means according to claim 3, wherein said driving means include an electric motor for raising said weight.

9. Generator means according to claim 7, in which said electric lamp is a fluorescent tube having a step-up voltage provided therewith.

References Cited

UNITED STATES PATENTS

| | | | |
|---|---|---|---|
| 396,557 | 1/1889 | Gmur et al. | 290—1 |
| 1,575,538 | 3/1926 | Bushnell | 307—84 |
| 2,105,719 | 1/1938 | Collins | 290—1 |

ORIS L. RADER, Primary Examiner

W. E. DUNCANSON, JR., Assistant Examiner